(12) United States Patent
Feng et al.

(10) Patent No.: US 11,244,490 B2
(45) Date of Patent: Feb. 8, 2022

(54) IMAGE CONVERSION METHOD, IMAGE CONVERSION SYSTEM, IMAGE CONVERSION DEVICE, REMOTE CONTROLLER AND STORAGE MEDIUM

(71) Applicant: BOE TECHNOLOGY GROUP CO., LTD., Beijing (CN)

(72) Inventors: Dandan Feng, Beijing (CN); Feng Feng, Beijing (CN); Shaonan Zhang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/527,742

(22) Filed: Jul. 31, 2019

(65) Prior Publication Data
US 2020/0211249 A1  Jul. 2, 2020

(30) Foreign Application Priority Data
Jan. 2, 2019 (CN) .......................... 201910002799.0

(51) Int. Cl.
*G06T 13/80* (2011.01)
*G01F 1/56* (2006.01)
*G01F 9/00* (2006.01)

(52) U.S. Cl.
CPC ............... *G06T 13/80* (2013.01); *G01F 1/56* (2013.01); *G01F 9/008* (2013.01)

(58) Field of Classification Search
CPC .................................................... G06T 13/80
See application file for complete search history.

(56) References Cited

U.S. PATENT DOCUMENTS

| | | | | |
|---|---|---|---|---|
| 6,300,947 B1 * | 10/2001 | Kanevsky | ........... | G06F 16/9577 715/866 |
| 6,476,802 B1 * | 11/2002 | Rose | ....................... | G06T 13/00 345/419 |
| 2010/0070089 A1 * | 3/2010 | Harrod | .................... | F24F 11/30 700/277 |
| 2010/0211467 A1 * | 8/2010 | Ramanathan | ......... | G06F 16/957 705/14.72 |
| 2011/0194703 A1 * | 8/2011 | Akino | ...................... | H04R 3/04 381/26 |
| 2012/0098802 A1 * | 4/2012 | Woon Feather | ... | H04N 21/4104 345/204 |

(Continued)

FOREIGN PATENT DOCUMENTS

| | | |
|---|---|---|
| CN | 103516897 A | 1/2014 |
| CN | 104125343 A | 10/2014 |

(Continued)

*Primary Examiner* — Phi Hoang
(74) *Attorney, Agent, or Firm* — The Webb Law Firm

(57) ABSTRACT

The embodiments of the present application provide an image conversion method, an image conversion system, an input device, a display device and a non-transitory computer readable storage medium. The image conversion method comprises: receiving, by an input device, an airflow, and generating airflow information; obtaining, by a display device, dynamic parameters according to the airflow information; converting, by the display device, the static image into a dynamic image according to the dynamic parameters; displaying, by the display device, the converted dynamic image.

15 Claims, 4 Drawing Sheets

(56) References Cited

U.S. PATENT DOCUMENTS

| | | | | |
|---|---|---|---|---|
| 2012/0290397 | A1* | 11/2012 | Cortegiano | G06Q 30/0207 |
| | | | | 705/14.64 |
| 2013/0201194 | A1* | 8/2013 | Ko | G06F 3/0487 |
| | | | | 345/473 |
| 2014/0137584 | A1* | 5/2014 | Kim | F24F 1/01 |
| | | | | 62/126 |
| 2014/0344670 | A1* | 11/2014 | Cathey | G06F 16/9535 |
| | | | | 715/234 |

FOREIGN PATENT DOCUMENTS

| | | |
|---|---|---|
| CN | 105373314 A | 3/2016 |
| CN | 105446487 A | 3/2016 |
| CN | 107688452 A | 2/2018 |

\* cited by examiner

IMAGE CONVERSION METHOD, IMAGE CONVERSION SYSTEM, IMAGE CONVERSION DEVICE, REMOTE CONTROLLER AND STORAGE MEDIUM

CROSS-REFERENCE TO RELATED APPLICATIONS

The present application claims priority to Chinese Patent Application No. 201910002799.0, filed on Jan. 2, 2019, which is hereby fully incorporated herein by reference in its entirety.

TECHNICAL FIELD

The invention relates to an image conversion method, an image conversion system, an image conversion device, a remote controller and a non-transitory computer readable storage medium.

BACKGROUND

Currently, in the field of display, a user may create a plurality of static images in advance, and play the plurality of static images sequentially to generate a dynamic image.

SUMMARY

The present application provides an image conversion method, comprising:

receiving, by an input device, an airflow, and generating airflow information;

obtaining, by a display device, dynamic parameters according to the airflow information;

converting, by the display device, the static image into a dynamic image according to the dynamic parameters;

displaying, by the display device, the converted dynamic image.

According to one or more embodiments of the present application, the image conversion method further comprises transmitting, by the input device, the airflow information to the display device via a wireless transfer protocol.

According to one or more embodiments of the present application, the airflow includes one or more of an airflow blown by a user, an airflow from an airflow generating device, or a natural airflow.

According to one or more embodiments of the present application, the airflow information includes one or more of a magnitude of the airflow, a direction of the airflow, or a time length of the airflow.

According to one or more embodiments of the present application, the static image is a static image being displayed by the display device.

According to one or more embodiments of the present application, the dynamic parameters represent a parameter that is needed for moving a subject in the static image when converting the static image into a dynamic image.

According to one or more embodiments of the present application, the subject in the static image includes, among objects shown in the static image, at least one of the objects which are movable when blown by the airflow or the objects the movement of which are representative of motions of the airflow.

According to one or more embodiments of the present application, the dynamic parameters comprise one or more of direction, speed, distance, frequency, or time length of the movement of the subject.

According to one or more embodiments of the present application, converting the static image into a dynamic image according to the dynamic parameter includes causing the pixel of the subject to move according to the dynamic parameter.

According to one or more embodiments of the present application, converting the static image to a dynamic image according to the dynamic parameter further comprises restoring pixels of the subject to respective original positions in the static image after displaying of the dynamic image ends.

According to one or more embodiments of the present application, converting the static image into a dynamic image according to the dynamic parameter further includes identifying subjects in the static image.

According to one or more embodiments of the present application, converting the static image into a dynamic image according to the dynamic parameter by the display device further includes adding subjects in the static image.

According to one or more embodiments of the present application, adding subjects to the static image further includes identifying a scene of the static image and adding the subjects corresponding to the scene to the static image.

According to one or more embodiments of the present application, the subjects corresponding to the scene are selected from a dynamic model library stored in advance in correspondence with the scene.

The present application further provides an image conversion system including an input device and a display device, wherein the input device is configured to receive an airflow, generate airflow information and transmit the airflow information to the display device, and the display device is configured to receive airflow information from the input device, obtain dynamic parameters based on the airflow information, convert a static image to a dynamic image based on the dynamic parameter, and display the converted dynamic image.

The present application further provides an input device configured to perform the above-described image conversion method, the input device including an airflow sensor, a processor and a transmitter, wherein the airflow sensor is configured to receive an airflow and generate a corresponding sensed signal, the processor is configured to generate airflow information based on the sensed signal, and the transmitter is configured to transmit the airflow information to the display device.

According to one or more embodiments of the present application, the input device further comprise vent holes on a housing of the input device, the vent holes being arranged in an array on both sides of the input device for receiving airflow blowing from either direction.

The present application further provides a display device configured to perform the above-described image conversion method, the display device comprising a receiver, a processor and a display, wherein the receiver is configured to receive airflow information from the input device, the processor is configured to obtain a dynamic parameter from the airflow information and convert a static image to a dynamic image based on the dynamic parameters, and the display is configured to display the converted dynamic image.

The present application further provides a non-transitory computer readable storage medium having stored thereon a computer program including instructions, which when executed by a processor, causes the processor to implements the above-described image conversion method.

BRIEF DESCRIPTION OF THE DRAWINGS

In order to describe the technical solutions in the embodiments of the present application more clearly, the drawings that are needed to be used in the description of the embodiments of the present application will be briefly described below.

DETAILED DESCRIPTION

The embodiments of the present application will be described in detail in the following content. Examples of the embodiments are illustrated in the accompanying drawings, and the same or similar reference signs refer to the same or similar elements or elements having the same or similar functions. The embodiments described below by reference to the drawings are exemplary, and are only used for the purpose of explaining the present application and are not to be construed as limiting the invention.

In order to make the objects, technical solutions and advantages of the present application clearer, the embodiments of the present application will be described in further detail below with reference to the accompanying drawings. The technical solution of the present application and how the technical solution of the present application solves the technical problems are described in detail below with specific embodiments. The embodiments of the present application will be described with reference to the accompanying drawings.

Figure 1:
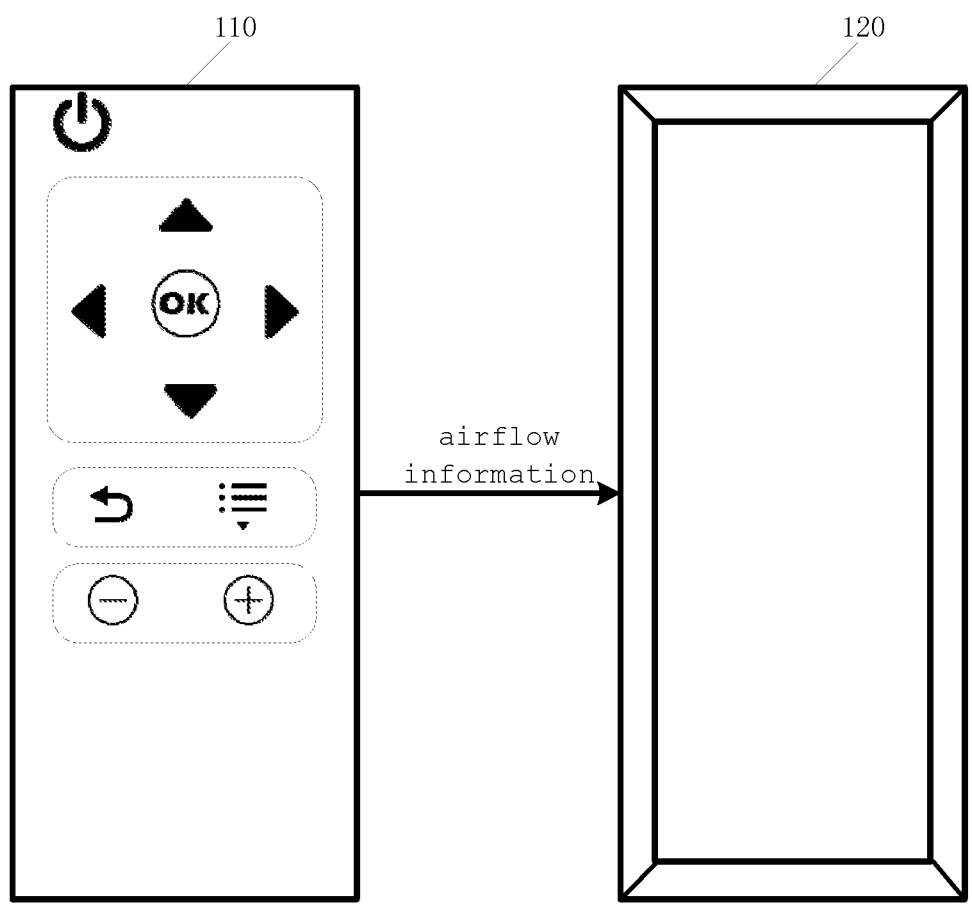
FIG. 1 is a schematic structural diagram of an image conversion system provided by an embodiment of the present application.

Embodiments of the present application provide an image conversion system. FIG. 1 is a schematic structural diagram of an image conversion system according to an embodiment of the present application.

As shown in FIG. 1, the image conversion system comprises an input device 110 and a display device 120. The input device 110 can be a remote controller, a keyboard, a mouse, or the like. The display device 120 can be a device with a display function, such as a computer display, a television, an electronic photo frame, a mobile phone, and a tablet computer. The input device 110 and the display device 120 are connected based on a wireless communication protocol. The wireless communication protocol can include an infrared communication protocol, a Zigbee communication protocol, an NFC communication protocol, a Bluetooth communication protocol, a wireless local area network communication protocol, and a cellular communication protocol, etc.

In one or more embodiments according to the present disclosure, the input device 110 is a remote controller, the display device 120 is an electronic photo frame, and the input device 110 and the display device 120 are connected by a Bluetooth communication protocol.

The input device 110 is used for receiving an airflow and outputting airflow information. The airflow can be an airflow blown by a user or an airflow from an airflow generating device (e.g., a fan, an air conditioner), or can be a natural airflow. The airflow information includes the magnitude of the airflow, the direction of the airflow, and the time length of the airflow, etc. In one or more embodiments of the present disclosure, the airflow is an airflow blown by the user, and in these embodiments, the airflow information includes a magnitude of the airflow blown by the user, a direction of the airflow blown by the user, and a time length of the airflow blown by the user. The input device 110 can output airflow information to the display device 120. The specific operation of the input device 110 is further described below.

The display device 120 is used for receiving the airflow information transmitted from the input device 110 and obtain dynamic parameters according to the airflow information. In addition, the display device 120 converts the static image into a dynamic image according to dynamic parameters and displays the dynamic image. The static image can be a static image being displayed on the display device 120, or can be another static image. The specific operation of display device 120 will be described further in the following text.

Figure 2:
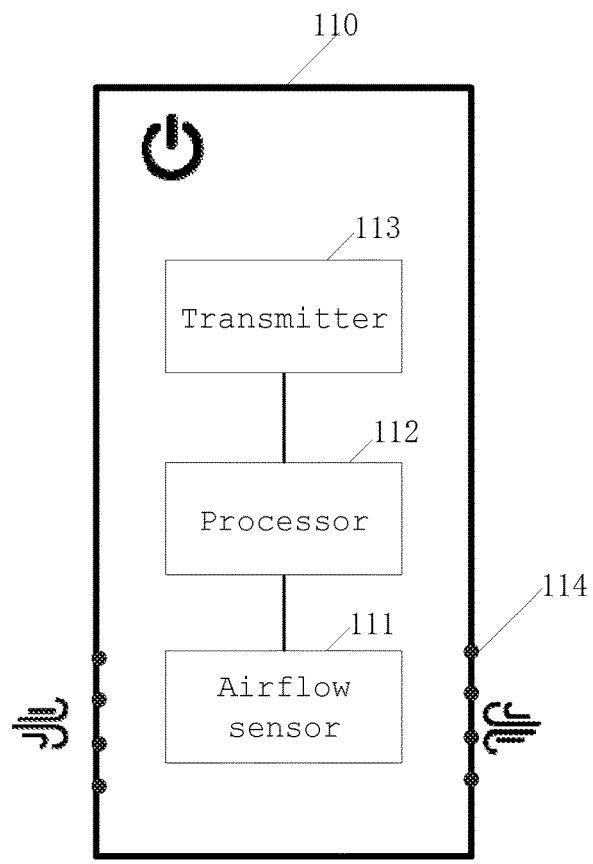
FIG. 2 is a schematic structural diagram of an input device provided by an embodiment of the present application.

FIG. 2 is a schematic structural diagram of the input device 110 provided by an embodiment of the present application. As shown in FIG. 2, the input device 110 includes an airflow sensor 111, a processor 112, and a transmitter 113.

The airflow sensor 111 is configured to receive an airflow and output a corresponding sensed signal. The processor 112 is configured to identify the airflow information based on the sensed signal. The airflow information includes the magnitude, direction and time length of the airflow, etc. The transmitter 113 is used for transmitting the airflow information to the display device 120.

The housing of the input device 110 can have vent holes 114 therein. The vent holes 114 can be arranged in an array on both sides of the input device 110 for receiving airflows blown from either direction. Specifically, as shown in FIG. 2, the vent holes 114 can be distributed on both sides of the lower portion of the input device 110.

Figure 3:
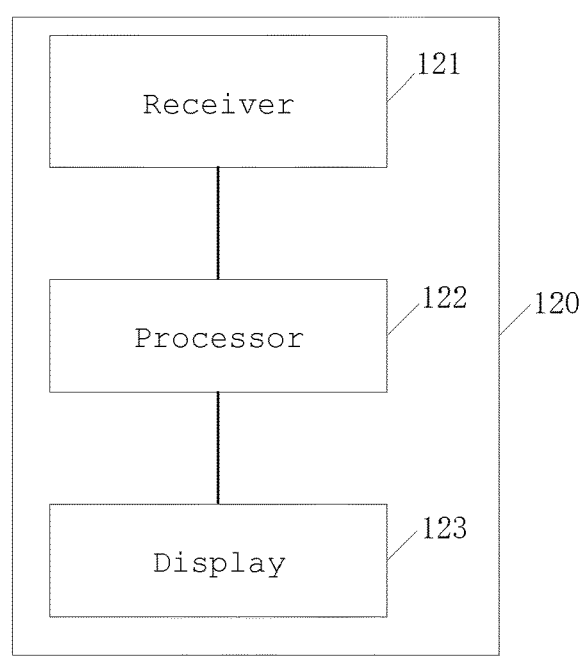
FIG. 3 is a schematic structural diagram of a display device provided by an embodiment of the present application.

FIG. 3 is a schematic structural diagram of the display device 120 provided by an embodiment of the application. As shown in FIG. 3, the display device 120 includes a receiver 121, a processor 122 and a display 123.

The receiver 121 is used to receive the airflow information transmitted from the input device 110. The processor 122 is configured to obtain dynamic parameters based on the airflow information. In addition, the processor 122 also converts the static image displayed on the display device 120 into a dynamic image according to the dynamic parameters. The display 123 is used for displaying the converted dynamic image.

Figure 4:
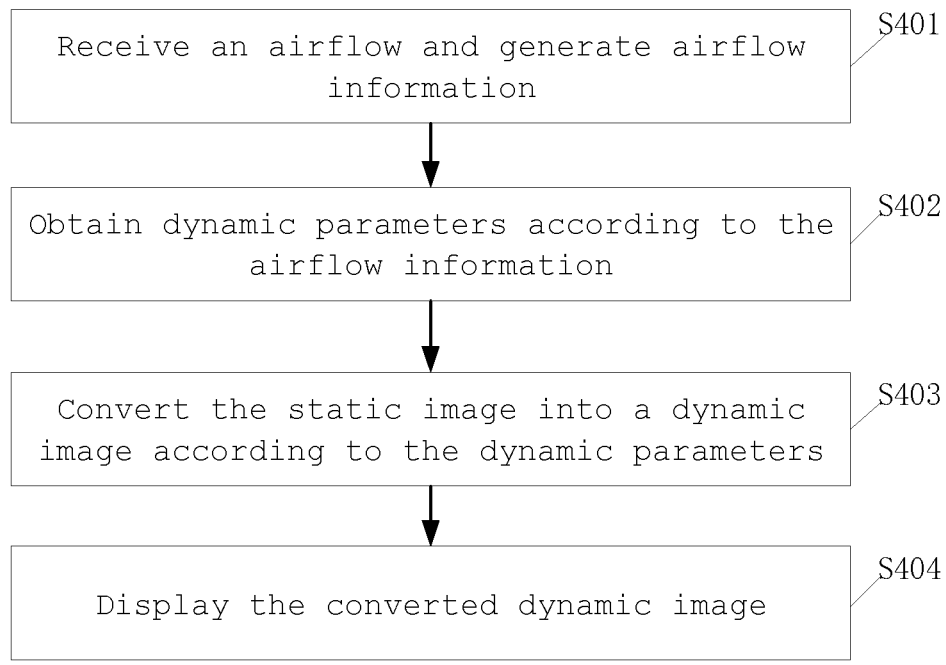
FIG. 4 is a schematic flow chart of an image conversion method provided by an embodiment of the present application.

FIG. 4 is a schematic flow chart of an image conversion method according to an embodiment of the present application.

As shown in FIG. 4, the image conversion method includes:

S401, receiving an airflow and generating airflow information;

S402, obtaining dynamic parameters according to the airflow information;

S403, converting the static image into a dynamic image according to the dynamic parameters; and S404, displaying the converted dynamic image.

In step S401, the input device 110 receives an airflow, and the airflow sensor 111 in the input device 110 generates a corresponding sensed signal according to the airflow. In one embodiment, the input device 110 receives airflows from the left and right sides through the air holes 111 disposed at the left and right sides of the input device 110, and converts the received air blows in different directions into different sensed signal outputs. For example, the user can blow from left to right on the left side of the input device 110, or from right to left on the right side of the input device 110. The sensed signal output from the airflow sensor 111 includes the magnitude of the voltage, the positive/negative polarity of the voltage, and the maintenance time length of the voltage. Specifically, by setting the positive and negative polarities of the sensed signal, the direction of the airflow can be indicated. For example, if airflow enters the input device 110 from left to right, the voltage output by the airflow sensor 111 is positive, and if airflow enters the input device 110 from right to left, the voltage output by the airflow sensor 111 is negative. Further, the stronger the intensity of the airflow entering the input device 110 is, the greater the voltage value of the sensed signal output by the airflow sensor 111 is. Further, the longer the time period for which the airflow is maintained is, the longer the maintenance time length of the voltage output by the airflow sensor 111 is. In one or more embodiments of the present disclosure, the airflow is an airflow blown by a user.

In addition, those skilled in the art will also appreciate that the sensed signal can also be a current signal and include the magnitude of the current, the positive/negative polarity of the current, and the maintenance time length of the current. The magnitude of the current represents the magnitude of the airflow, the positive/negative polarity of the current represents the direction of the airflow, and the maintenance time length of the current represents the time length of the airflow.

Additionally, the magnitude of the voltage or current of the sensed signal can vary along with time, thereby indicating a situation where the magnitude and direction of the airflow varies along with time.

In step S402, the display device 120 receives the airflow information from the input device 110 through the receiver 121. Thereafter, the processor 122 of the display device 120 obtains the dynamic parameters based on the airflow information.

The dynamic parameters refer to parameters that are needed for making a subject in a static image move when converting the static image into a dynamic image. The subject in the static image includes, among the respective objects shown in the static image, an object that can move when blown by an airflow and an object whose movement can represent the motion of the airflow. For example, in a landscape image, a cloud, a sea, a small tree, a grassland, a sailing boat, a curtain, a windmill, or the like in the landscape image moves or swings when being blown by an airflow, and thus belongs to an object that can move when being blown by an airflow. In addition, running athletes, galloping horses, running cars, and rotating fans all indicate the generation of airflow, and therefore belong to objects whose movement represents the motion airflow and the like. These subjects are kept still in the static image, and according to the technical solution of the present disclosure, the subjects can move according to the airflow information, so that a dynamic effect is obtained. The dynamic parameters represent parameters for defining such movement of the subject and include, for example, direction, speed, distance/amplitude, frequency, time length of the movement of the subject, etc.

For example, when a tree is included in the static image, the crown of the tree can serve as a subject, and the dynamic parameters obtained from the airflow information indicate information including the size of a portion of the crown that is swinging, whether the crown is swung to the left or right, the speed of the swing, the amplitude of the swing, the frequency of the swing, the time length of the swing, and the like. For example, the greater the airflow magnitude represented by the dynamic parameters is, the bigger the swinging portions of the tree crown is, the faster the speed of the swing is, and the greater the amplitude of the swing is. Furthermore, the crown should swing from the initial position in the direction in which the airflow is blowing and swing back to the initial position after reaching the amplitude of the swing. Moreover, the frequency and time length of the swing of the crown is also related to the time length of the airflow.

For example, when a sailing boat appears in the static image, the sailing boat can be the subject, and the dynamic parameters include whether the sailing boat is moving left or right, the speed of movement, the distance of the movement, the time of the movement, etc. For example, the greater the airflow magnitude represented by the dynamic parameter is, the greater the moving speed of the sailing boat is, and the farther the moving distance is. Furthermore, the sailing boat should move in the direction of the airflow, and the distance and time of the movement are related to the time length of the airflow. In addition, the sail of the sailing boat can be taken as a subject, and the dynamic parameters comprise whether the sail is bulged or not.

For example, when a galloping horse appears in the static image, the horse can be the subject, and the dynamic parameters indicate information including whether the horse is galloping to the left or right, the speed of the galloping, the distance of the galloping, the time of the galloping, etc. For example, the larger the airflow magnitude represented by the dynamic parameters is, the faster the speed of movement of the horse is, and the further the galloping distance is. Moreover, the horse can galloped in the direction of the airflow, and the distance and time length of the galloping can be related to the time length of the airflow. In addition, the mane on the horse body can be used as a subject, and the dynamic parameters comprise whether the mane floats or not.

For example, when a fan appears in a static image, the fan blades of the fan can be the subject, and the dynamic parameters include the direction in which the fan blades rotate, the speed of rotation, the time of rotation, and the like. For example, the greater the airflow magnitude represented by the dynamic parameters is, the greater the speed at which the fan rotates is. Further, the direction of the fan rotation can be changed as the direction of the airflow is changed, and the time of the fan rotation can be related to the time length of the airflow.

In one specific example, the correspondence between the magnitude of the sensed signal, the magnitude of the airflow, and the distance of movement in the dynamic parameters can be as shown in table 1:

TABLE 1

| Magnitude of sensed signal (mV) | 5-20 | 20-40 | 40-100 |
|---|---|---|---|
| Magnitude of the airflow | 20 | 40 | 100 |
| Moving distance (pixel) | 20 | 40 | 100 |

It should be noted that the magnitude of the sensed signal can be in a certain range, such as 5 mV to 20 mV shown in the first column of table 1, such that the data in the first column indicates that when the magnitude of the airflow is 20 or less, the corresponding sensed signal can be 5 mV to 20 mV and the corresponding displacement of the motion of the dynamic image is 20 pixels. Therefore, the situation that the effect of the movement of the subject in the dynamic image is not obvious enough when the airflow information is small can be avoided.

Thereafter, in step S403, the processor 122 of the display apparatus 120 converts the static image into a dynamic image according to the dynamic parameters. Specifically, the processor 122 of the display device 120 causes the subject in the static image to move according to the dynamic parameters, so as to obtain a dynamic image.

First, the processor 122 of the display device 120 recognizes a subject in a static image displayed on the display 123 of the display device 120, that is, as described above, the processor 122 recognizes an object that can move when blown by an airflow and an object whose movement can represent the movement of the airflow among the respective objects shown in the still image. For example, the processor 122 identifies clouds, sea, trees, grasslands, sail boats, curtains, windmills in the static image, as well as running athletes, galloping horses, traveling cars, rotating fans in the static image and so on.

Thereafter, the processor 122 of the display device 120 causes the subject to start moving according to the dynamic parameters. When the subject is a crown of a tree, a plurality of pixel points are selected from the image of the crown, and the selected pixel points are moved together along the direction of the airflow and slightly shifted downward because the crown cannot can not move away from the trunk of the tree. It can be understood that the stronger the airflow represented by the dynamic parameter is, the further the moving distance of the pixel point is. After the image of the subject is moved, the pixel at the original position of the pixel point needs to be modified into the pixel of the background pixel point so as to avoid the blank generated after the image of the subject is moved. The specific method of moving and modifying the pixel points is similar to that in the related art, and is not described herein again.

It is understood that when the subject is a fixed object such as a crown of a tree, a grass, a curtain, or the like, the subject in the moving image needs to be restored from the moved position to the original position after the airflow stops. In addition, when the subject is a movable object such as a horse or a sailing boat, the subject in the dynamic image can not be restored from the moved position to the original position after the airflow stops. The method of restoring the subject to the original position is similar to the method of moving the subject from the original position and is omitted here.

After the playing of the moving image is completed, the corresponding dynamic parameters and the images of the intermediate stages generated in the dynamic image conversion process can be stored. When the airflow is received next time, the current dynamic parameters of the airflow can be compared with the previously stored dynamic parameters, and when the current dynamic parameters are consistent with the previously stored dynamic parameters, the stored images of the intermediate stages can be directly displayed sequentially so as to display the dynamic image.

In addition, the processor 122 of the display device 120 can add a subject on the display 123 of the display device 120 as needed to increase the dynamic effect of the obtained dynamic image. In one embodiment of the present disclosure, a subject can be added to a static image when there is no subject or the number of subjects is too small in the static image. For example, the processor 122 of the display device 120 can determine a scene (e.g., sky, river, sea, grassland, etc.) of a static image, add a subject (e.g., white cloud, fish, sailing boat, horse, etc.) corresponding to the scene in the static image, and make the added subject to move in the static image. In one embodiment of the present disclosure, a dynamic model library of the subjects can be established in advance. The dynamic model library includes a large amount of historical data and different dynamic models. A dynamic model matched with a static image is searched from the dynamic model library according to the determined scene and dynamic parameters, and the dynamic model is fused into the static image according to the dynamic parameters to generate the dynamic image. The specific method for fusing the dynamic model and the static image in the embodiment of the present application is similar to those in the related art, and is not further described herein. For example, a dynamic model of a galloping horse can be obtained based on the identified scene of the grassland and fused with the static image. Upon fusion, the galloping horse enters the static image from a corresponding side of the display 123 in the direction of the airflow and moves from that side of the static image to the other side and can eventually exit the static image. As discussed above, the speed at which the horse gallops corresponds to the magnitude of the airflow and the direction in which the horse gallops corresponds to the direction of the airflow. In one example, the distance that the horse gallops corresponds to the time length of the airflow. In another example, the horse can gallop until leaving the static image after entering the static image, and in this case, the distance in which the horse gallops is irrelevant to the time length of the airflow.

Finally, in step S404, the display 123 in the display device 120 displays the converted dynamic image.

In the embodiments of the present application, the airflow is received by the input device and airflow information is generated. Thereafter, the airflow information is processed to obtain dynamic parameters. Next, by the display device, the static image is converted into a dynamic image according to the dynamic parameters, and the converted dynamic image is displayed. The airflow received by the input device can be an airflow blown by the user. Therefore, according to the image conversion system disclosed in the present invention, the static target image can be converted into a dynamic image according to the airflow environment surrounding the input device or the intention of the user, so as to realize real-time interaction between the display equipment and the environment and the user and improve the user experience.

Figure 5:
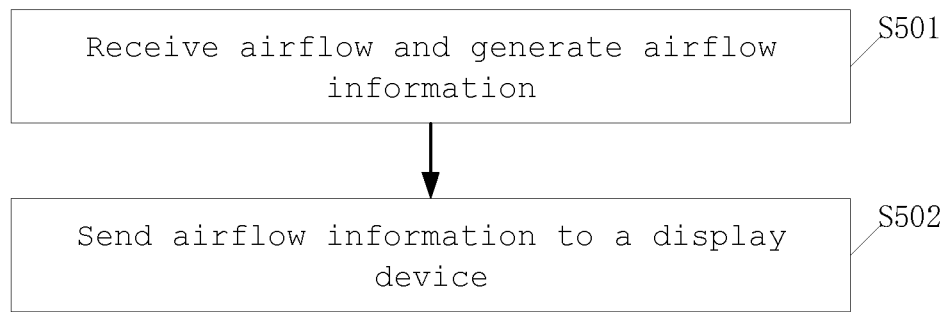
FIG. 5 is a schematic flow chart illustrating an image conversion method performed by an input device provided by an embodiment of the present application.

The embodiments of the present application provide an image conversion method performed by an input device, and FIG. 5 is a schematic flowchart of the image conversion method performed by the input device according to the embodiments of the present application. As shown in FIG. 2, the image conversion method includes:

S501, receiving airflow and generating airflow information; and

S502, sending airflow information to a display device.

Step S501 is similar to step S401 and the explanation thereof is not repeated here.

In step S502, the input device can transmit the airflow information to the display device via Bluetooth or other wireless transmission protocol, so that the display device displays the corresponding dynamic image.

Figure 6:
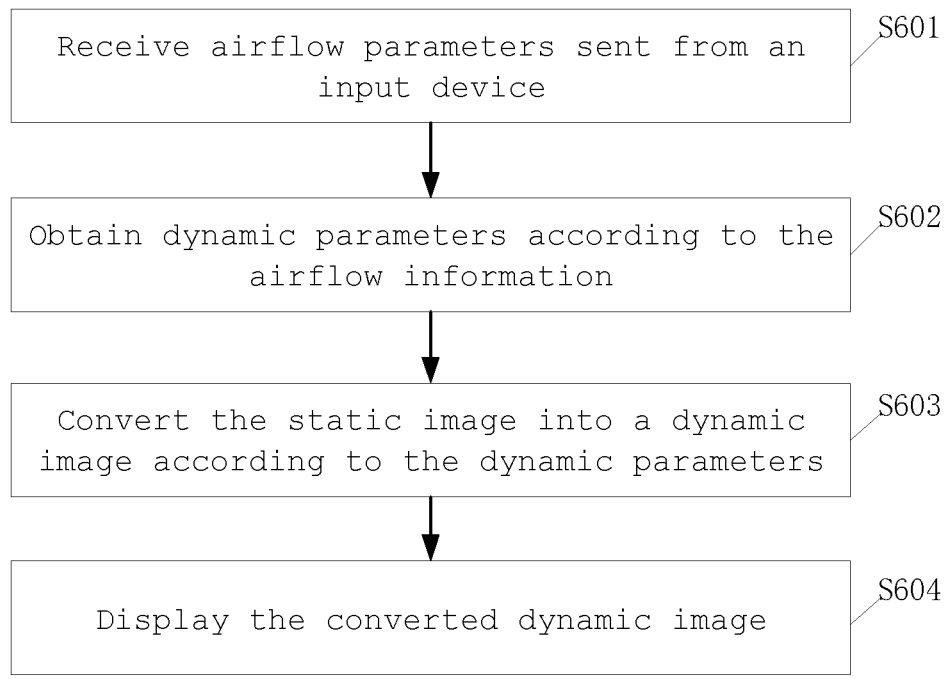
FIG. 6 is a schematic flow chart of an image conversion method performed by a display device provided by an embodiment of the present application.

The embodiment of the invention provides an image conversion method executed by a display device. FIG. 6 is a schematic flowchart of an image conversion method performed by a display device according to an embodiment of the present application. As shown in FIG. 6, the image conversion method includes:

S601, receiving airflow parameters sent from an input device;

S602, obtaining dynamic parameters according to the airflow information;

S603, converting the static image into a dynamic image according to the dynamic parameters; and S604, displaying the converted dynamic image.

In step S601, the display apparatus can receive the airflow information transmitted from the input device through Bluetooth or other wireless transmission protocol.

Steps S602-S604 are similar to steps S402-S404 and the explanations thereof are not repeated here.

In one or more embodiments of the present disclosure, step S602 in FIG. 6 can be performed by an input device. That is, the processor of the input device obtains the dynamic parameters from the airflow information, and the input device transmits the dynamic parameters to the display device.

Embodiments of the present application further provide a non-transitory computer readable storage medium having stored thereon a computer program including instructions, where the instructions, when executed by a processor, causes the processor to implements S401 to S404 in the image conversion method provided by the embodiments of the present application;

or, the instructions, when executed by the processor, causes the processor to implement S501 to S502 in the image conversion method executed by the input device provided by the embodiment of the present application;

or, the instructions, when executed by the processor, causes the processor to implement S601 to S604 in the image conversion method executed by the display device provided by the embodiment of the present application.

The implementation principle of the non-transitory computer readable storage medium provided by the embodiment of the present application is similar to the implementation principle of the method provided by the method embodiment, and is not described herein again.

It should be understood that although the steps in the flowchart of the drawings are shown in sequence as indicated by the arrows, the steps are not necessarily performed in the sequence indicated by the arrows. The steps are not strictly limited to their performance in order, and can be performed in other orders, unless explicitly stated herein. Furthermore, at least a portion of the steps in the flowcharts of the figures can include a plurality of sub-steps or stages, which are not necessarily performed at the same time, but can be performed at different times, and the order of execution thereof is not necessarily performed sequentially, and can be performed in turn or alternately with other steps or at least a portion of the sub-steps or stages of other steps.

The foregoing is merely part of the embodiments of the present application, and it should be noted that several modifications and variations can be made by those skilled in the art without departing from the principles of the present application, and these modifications and variations should be considered as the protection scope of the present application.

What is claimed is:

1. An image conversion method, comprising:
receiving, by an input device, an airflow, and generating airflow information;
obtaining, by a display device, dynamic parameters according to the airflow information;
converting, by the display device, a static image into a dynamic image according to the dynamic parameters; and
displaying, by the display device, the converted dynamic image,
the method further comprising identifying a scene of the static image when there is no subject in the static image or the number of the subjects in the static image is smaller than a predetermined value, selecting, as subject, a dynamic model corresponding to the identified scene from a dynamic model library stored in advance in correspondence with the scene, and fusing the selected dynamic model into the static image, the dynamic model includes at least one of the objects which are movable when blown by the airflow or the objects the movement of which are representative of motions of the airflow, and the dynamic model enters the dynamic image from one side of the dynamic image and moves until it leaves the dynamic image on another side of the dynamic image.

2. The image conversion method of claim 1 further comprising transmitting, by the input device, the airflow information to the display device via a wireless transfer protocol.

3. The image conversion method of claim 1 wherein the airflow includes at least one of the airflow blown by a user, the airflow from an airflow generating device, or a natural airflow.

4. The image conversion method of claim 1, wherein the airflow information includes at least one of a magnitude of the airflow, a direction of the airflow, or a time length of the airflow.

5. The image conversion method of claim 1, wherein the static image is an image displayed by the display device.

6. The image conversion method of claim 1, wherein the dynamic parameters represent parameters that are needed for moving a subject in the static image when converting the static image into the dynamic image.

7. The image conversion method of claim 1 wherein the dynamic parameters comprise at least one of direction, speed, distance, frequency, or time length of the movement of the subject.

8. The image conversion method of claim 1, wherein converting the static image into the dynamic image according to the dynamic parameters includes moving pixels of the subject according to the dynamic parameters.

9. The image conversion method of claim 1, wherein converting the static image to the dynamic image according to the dynamic parameters further comprises restoring pixels of the subject to respective original positions in the static image after displaying of the dynamic image ends.

10. The image conversion method of claim 1, wherein converting the static image into the dynamic image according to the dynamic parameters further includes identifying subjects in the static image.

11. A non-transitory computer readable storage medium having stored thereon a computer program including instructions, which when executed by a processor, causes the processor to implement the image conversion method of claim 1.

12. An image conversion system including an input device and a display device, wherein the input device is configured to receive an airflow, generate airflow information and transmit the airflow information to the display device, and the display device is configured to receive the airflow information from the input device, obtain dynamic parameters based on the airflow information, convert a static image to a dynamic image based on the dynamic parameter, and display the converted dynamic image, and the display device is further configured to identify a scene of the static image when there is no subject in the static image or the number of the subjects in the static image is smaller than a predetermined value, selecting, as subject, a dynamic model corresponding to the identified scene from a dynamic model library stored in advance in correspondence with the scene and fusing the selected dynamic model into the static image, the dynamic model includes at least one of the objects which are movable when blown by the airflow or the objects the movement of which are representative of motions of the airflow, and the dynamic model enters the dynamic image from one side of the dynamic image and moves until it leaves the dynamic image on another side of the dynamic image.

13. The system of claim 12, wherein the input device comprises an airflow sensor, a processor and a transmitter, wherein the airflow sensor is configured to receive an airflow and generate a corresponding sensed signal, the processor is configured to generate the airflow information based on the sensed signal, the transmitter is configured to transmit the airflow information to the display device.

14. The system of claim 12, further comprising vent holes on a housing of the input device, the vent holes being arranged in an array on both sides of the input device for receiving airflow blowing from either direction.

15. The system of claim 12, wherein the display device comprises a receiver, a processor and a display, wherein the receiver is configured to receive the airflow information from the input device, the processor is configured to obtain a dynamic parameter from the airflow information and convert the static image to the dynamic image based on the dynamic parameter, the display is configured to display the converted dynamic image.

* * * * *